United States Patent [19]

Madnick et al.

[11] Patent Number: 4,894,535

[45] Date of Patent: Jan. 16, 1990

[54] RADON GAS DETECTOR

[76] Inventors: Peter A. Madnick, 627 Valley Oak La., Thousand Oaks, Calif. 91360; Russell W. Sherwood, 3719 N. Wells, Kingman, Ariz. 86401

[21] Appl. No.: 251,793

[22] Filed: Oct. 3, 1988

[51] Int. Cl.⁴ .............................................. G01V 5/00
[52] U.S. Cl. ..................................... 250/255; 250/253; 250/435
[58] Field of Search .................. 250/255, 253, 423 R, 250/435, 336.1, 364, 380

[56] References Cited

U.S. PATENT DOCUMENTS

| | | | |
|---|---|---|---|
| 2,892,091 | 6/1959 | Sawle | 250/364 |
| 4,260,890 | 4/1981 | Wright et al. | 250/435 |
| 4,262,203 | 4/1981 | Overhoff | 250/380 |
| 4,286,155 | 8/1981 | Utting | 250/435 |
| 4,295,045 | 10/1981 | Minami | 250/380 |

Primary Examiner—Carolyn E. Fields
Assistant Examiner—David L. Porta
Attorney, Agent, or Firm—Jack C. Munro

[57] ABSTRACT

A radon gas detector which utilizes a light-tight housing which is formed into an interior environment connecting chamber and an interior radiation ascertaining chamber. Ambient air is continuously drawn through the environment connecting chamber and any radiation in the air produces scintillations which are picked up and magnified and concentrated onto counting and integration electronics which in turn causes activation of display electronics to give a display representative of the level of radiation that has been detected.

8 Claims, 1 Drawing Sheet

RADON GAS DETECTOR

BACKGROUND OF THE INVENTION

The field of this invention relates to detectors and more particularly to a detector for detecting a radioactive gas known as radon.

Radon is defined as a radioactive noble gas formed in the radioactive decay of radium, actinium, or thorium. Radon is found in some radioactive minerals and is known to be emitted from these minerals within the ground. The gas passes through the ground to the surface of the earth. Upon reaching the surface of the earth, radon is breatheable by human beings. As the gas decays, it gives off radioactive alpha particles that can be inhaled and lodge in the lungs where they continue to radiate. Certain localized areas within a given geographical area will produce a substantially increased level of radon while other localized areas will have a negligible level of radon.

This radon can be concentrated within a building or house. If this building or house is not adequately ventilated, this concentration of radon can become a health hazard. Some houses draw radon gas up from the ground, such as a chimney. If ventilation is not adequate, the carcinogenic radon gas can accumulate.

The U.S. Environmental Protection Agency has recently released findings which warns that radon, which is odorless and invisible, is the number one environmental health risk in the United States. The EPA has stated that one out of five homes in the United States may have radon concentrations that exceed the limits set by the EPA. That limit is four picocuries per liter of air. The EPA has estimated that living in a house with radon level at ten picocuries per liter would be like smoking a package of cigarettes every day. At that level, the additional risk of contracting lung cancer from radon exposure would range from thirty thousand to one hundred twenty thousand lung cancer deaths per million people over a lifetime. Tests have been conducted within different states within the United States. The percentage of the homes that exceeded the four picocuries level within each of the States differed dramatically. The worst State was Colorado at thirty-nine percent with Alabama being least at six percent.

While radon is present almost everywhere, its concentration in any given spot is unpredictable. Certain geological formations are known to contain considerable uranium deposits. However, even within such areas, individual homes can have low radon levels. Conversely, high concentrations of radon have been found where no significant uranium deposits have been identified. Indeed, one house may prove low in radon while its next door neighbor can have an unacceptably high radon concentration. In a home, radon measurements are usually made in the basement, since radon generally enters from the earth beneath the foundation. However, the risk is not confined to the basement since radon bearing air diffuses about the house. A home heating or ventilating system may also distribute the radon gas to the upper stories. There is usually no problem having to do with apartments or rooms above a building's second floor.

Only a test for the presence of radon can tell you how safe one's home or building is. There are available several types of radon detectors.

The best known laboratory instrument for measuring radioactivity, the Geiger counter, is sensitive mainly to beta and gamma radiation which is present everywhere from natural sources such as the sun. However, alpha particles, being much larger in size and slower in movement, are usually stopped by a glass wall which is common with the Geiger counter so it cannot be used to inform one much about the level of radon.

The most accurate devices for measuring radon are far too expensive for most householders to consider. There are laboratory instruments that typically cost several thousands of dollars apiece and demand expertise to use. For those reasons, these instruments are used mainly by research institutions for their accuracy and ability to make continuous hour-by-hour readings and have provided the yardstick against which other radon detectors are measured.

Previously, there have been two types of detectors which have been marketed to the general public and are relatively inexpensive. The first type is known as an alpha-track device which consists of a small sheet of polycarbonate plastic similar to a lens from a pair of sunglasses. Alpha particles that strike the plastic cause microscopic pockmarks, beta and gamma rays just pass therethrough. After exposure, typically one month to one year, the detector is to be placed within an envelope and mailed to a lab. A count of the pockmarks gives a direct measure of the mean radon concentration that the slide was exposed to within the given period of time. These type of detectors are good for long term measurement, but are ill suited for a quick test.

Other types of devices utilize activated charcoal. These activated charcoal devices function to trap radon gas. After a period of exposure, the activated charcoal container is to be shipped to a lab for analysis.

The disadvantage to both of these systems is that there is no instantaneous warning to the consumer. The radiation level within a given home or building can rise to a dangerous level and not become known to the consumer until a much later date pending the return of a lab test result. The consumer may not send the exposed medium to the lab for months after the dangerous condition arises. Plus, it is common for the lab to take a month to return the results to the consumer. During this dangerous period of time no action has been taken by the consumer. There is a need for the radon gas to be continuously monitored and if the level of radon exceeds a certain level then an immediate warning is transmitted to the consumer so immediate action can be taken.

The best form of immediate action is ventilation. Natural, fan forced, or heat recovery ventilation can get rid of as much as ninety percent of the radon in a home.

SUMMARY OF THE INVENTION

The primary objective of the present invention is to construct an inexpensive radon gas detector which will continuously monitor radon gas level within a home or building and to denote to the consumer the approximate level of radon gas within that home or building so that the consumer can take appropriate immediate corrective measures.

The radon gas detector of the present invention is constructed of a sheet material, box-like housing, having an interior compartment which is divided by a transparent wall. On one side of this transparent wall is placed a phosphorescent coating, such as zinc sulfide. This zinc coating is located within an environment connecting chamber of the housing with the opposite side of the wall being located within a radiation ascertaining chamber. The entire interior chamber of the housing is closed to ambient light. Air is continuously drawn through the environment connecting chamber with any alpha particles contained within the air producing scintillations of the zinc sulfide coating. These scintillations are then focused via a lens onto a photodiode detector located within the radiation ascertaining chamber. Also, beta and gamma types of radiation causes scintillations which are detected by the photodiode detector. The output of the photodiode detector is transmitted to a microprocessor which is programmed to differentiate between the different types of radiation and is to count the amount of each type of radiation within a given period of time. This microprocessor is connected to display electronics which is progressively activated as the level of radiation increases with this activation remaining for a time period permitting corrective action to be taken by the consumer to decrease this radon gas concentration.

DETAILED DESCRIPTION OF THE SHOWN EMBODIMENT

Figure 1:
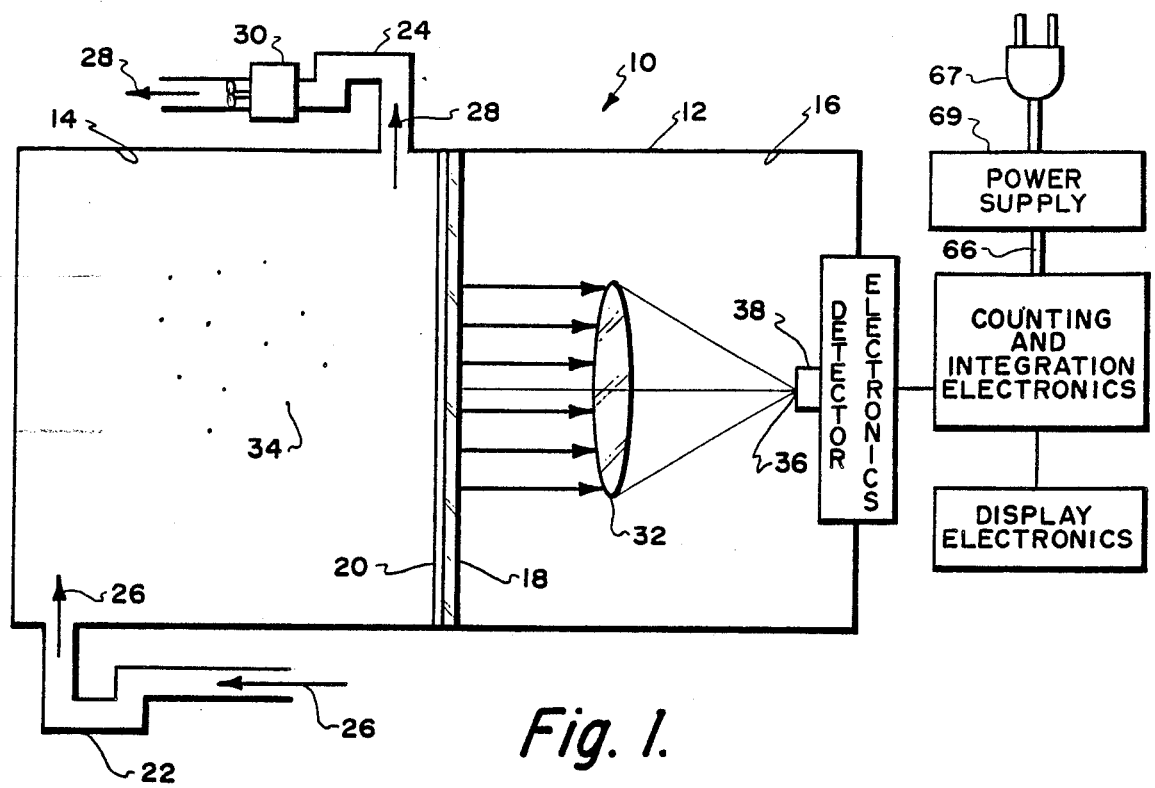
FIG. 1 is a diagrammatic view depicting in cross-section the housing of the radon gas detector of this invention showing its connection to the electronics, in box diagram form, which will result in displaying of the level of radon gas within a certain localized area.
Figure 2:
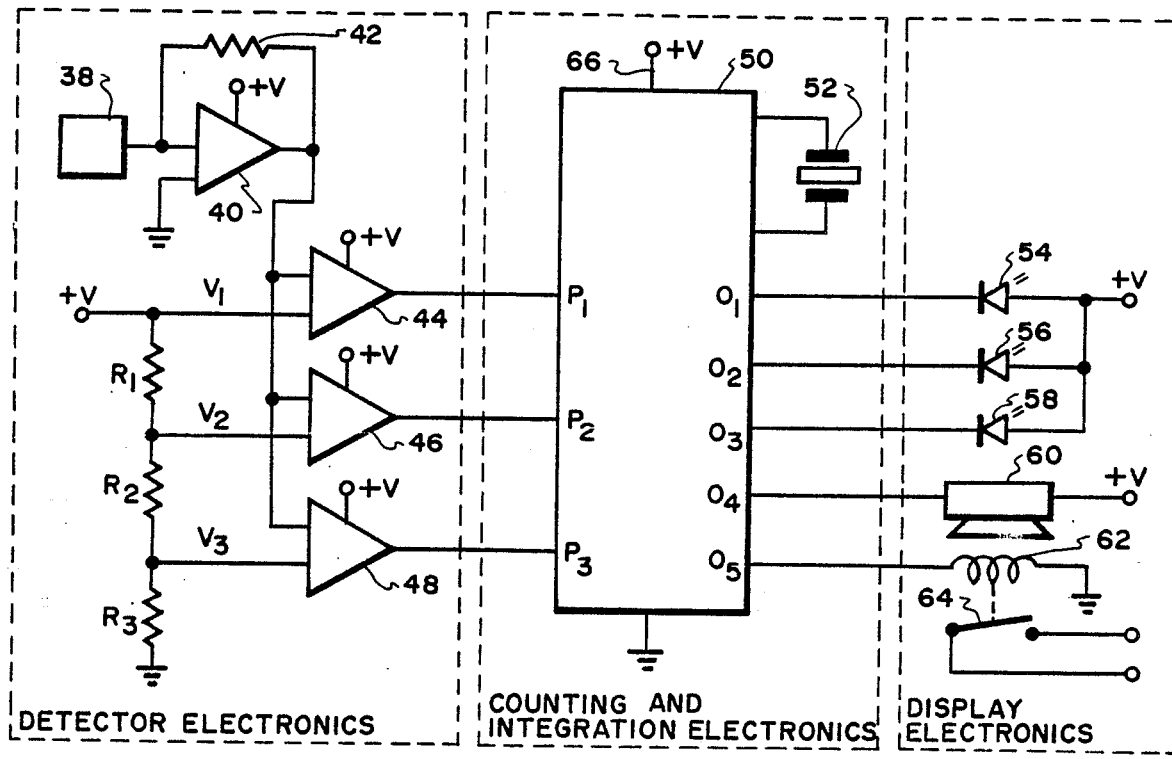
FIG. 2 is an electrical schematic of the electronics used in conjunction with the radon gas detector of the present invention.

Referring particularly to the drawing, there is shown in FIG. 1 the radon gas detector 10 of this invention which includes the use of a thin walled sheet material housing 12 which includes an interior chamber divided into two parts with one part being an environment connecting chamber 14 and the other part being a radiation ascertaining chamber 16. Dividing chambers 14 and 16 is a transparent wall 18. Wall 18 may be constructed of plastic or glass. Covering the surface of the wall 18 that is located within the chamber 14 is a coating 20. The purpose of the coating 20 is to be sensitive to radiation. A desirable composition for the coating 20 would be any desirable phosphorescent material such as zinc sulfide or cadmium sulfide.

Access into the chamber 14 is provided by means of an inlet conduit 22 and an outlet conduit 24. These conduits 22 and 24 are bent to form a labayrinth to prevent light from entering from the ambient. However, each of the conduits 22 and 24 are open to the ambient and air is permitted to pass through the inlet 22 as depicted by arrows 26 into the chamber 14 and then to be conducted through the outlet conduit 24 represented by arrows 28 back into the ambient. One way to achieve this air movement is by the use of a motor operated fan 30 which is mounted within the outlet conduit 24. It is to be understood that the fan 30 is to be driven electrically from a source (not shown). A steady slow stream of air through the chamber 14 is desirable. Therefore, a small motor operated fan 30 would be normally sufficient. Also, thermal or ionic air movement may be utilized.

Located within the chamber 16 is a concentrating lens assembly 32. If there is any radon gas located within the air that is conducted into the chamber 14 depicted as dots 34 within the chamber 14, such will produce scintillations upon decay causing a small amount of light to be emitted from coating 20. The function of the coating 20 is to react to these radioactive particles and produce light to be transmitted through transparent wall 18 to the lens 32. The lens 32 focuses the light combined from all the scintillations from coating 20 to a point 36. Located at this point 36 is a photodiode detector 38. When light strikes this photodiode detector 38, a pulse is generated. The electrical current of this pulse is then amplified by amplifier 40 to a more useful level and converted to a proportional voltage. Associated with the amplifier 30 is a resistor 42 for setting the voltage-to-current proportionality.

The output of the amplifier 40 is supplied to three in number of comparators 44, 46 and 48 in the form of amplifiers. These comparators 44, 46 and 48 serve as a pulse height discriminators separating out the pulses produced by the alpha, beta and gamma waves of the scintillations. This separation can be completed because each wave has a different amount of energy associated with it. The energy of a beta wave particle is about one-fifth or less that of an alpha wave particle. The energy level of gamma wave particle is greater than that of the beta wave particle but is less than the alpha wave particle. The relative energy of each particle produces a particular light brightness. The comparators 44, 46 and 48 function by comparing the input signal with a preestablished reference voltage $V_1$ being shown for comparator 44, $V_2$ being shown for comparator 46 and $V_3$ being shown for comparator 48. Resistors $R_1$, $R_2$ and $R_3$ are for the purpose of determining the subreference voltages $V_1$, $V_2$ and $V_3$.

An alpha wave particle would cause all three comparators 44, 46 and 48 to produce an output signal. The beta wave particle would cause comparators 46 and 48 to produce an output signal. The gamma wave particle would only cause comparator 48 to produce an output signal.

The output of comparator 44 is input to pin $P_1$ of a microprocessor 50. Similarly the output 46 is input to pin $P_2$ of the microprocessor 50 with the output of comparator 48 being supplied to pin $P_3$ of the microprocessor 50. The input signals to the comparators 44, 46 and 48 are in analog format with the output signals to $P_1$, $P_2$ and $P_3$ being a digital format. Therefore, the comparators 44, 46 and 48 each serve as an analog to digital convertor.

The microprocessor 50 includes a clock crystal 52. The input pulses to $P_1$, $P_2$ and $P_3$ are counted by the microprocessor 50 in view of time by the clock 52. The microprocessor 50 has been preprogrammed with safe levels of alpha particle pulses, beta particle pulses and gamma particle pulses for a set period of time. This microprocessor 50 is to be preprogrammed to take into consideration the danger level of each of the alpha wave particles, the beta wave particles and the gamma wave particles, each taken alone or in combination. This means that if no danger level is obtained of any of the particles taken alone or combined, only the light emitting diode 54 will be lit. A typical color for the lighting diode 54 would be green. If the level of detected pulses begins to exceed the safe level, the light emitting diode 54 will be deactivated and a second light emitting diode 56 will be lit. A typical color for the light emitting diode 56 would be yellow. If the level of pulses further increases, the light emitting diode 56 will be deactivated and instead light emitting diode 58 will be lit. A typical color for the light emitting diode 58 would be red. The consumer only needs to observe which color light emitting diode is activated and then can make a determination of whether the pulses that are being transmitted to the photodiode 38 is in the safe level, a cautionary level or dangerous level.

If the pulses exceed a predetermined maximum of the red light emitting diode 58 an audible alarm 60 will be activated. This alarm 60 is to denote to the consumer that an extremely dangerous condition exists and must be remedied immediately. A typical remedy would be immediate ventialtion of the house or building. Possibly, at the same time, along with the activation alarm 60, a relay coil 62 could be activated which would close a switch 64. Connected in conjunction with the switch 64 could be a ventilating fan (not shown). This ventilating fan could be mounted within the house or building (not shown) in a position to move air from the house or building into the atmosphere exteriorly of the house or building. This way, the amount of radon contained within the air located within the house or building is decreased.

The microprocessor 50 is supplied electrical energy from a power supply 69 which is connected to a conventional electrical plug 67. The output 66 of power supply 69 is a low voltage direct current which is input to microprocessor 50. This same low voltage 66 is supplied to all +V designations in the drawing. The microprocessor 50 is continuously running a software program. This prograam controls the output to the light emitting diodes 54, 56 and 58, audible alarm 60 and relay 62 and reads pulses being transmitted to pins $P_1$, $P_2$ and $P_3$. The software of the microprocessor 50 keeps track of the amount of time between each successive pulses on $P_1$, $P_2$ and $P_3$ and the total number of pulses being supplied to each pin $P_1$, $P_2$ and $P_3$ and over a fixed length of time. The microprocessor continues to compare these input counted pulses to preset values in the microprocessor's permanent memory and based on this selects which light emitting diode 54, 56 and 58 is to be energized via outputs $O_1$, $O_2$ and $O_3$. Output $O_4$ is for alarm 60 and output $O_5$ is for relay 62. As radiation levels decrease, the microprocessor will deactivate the noted more dangerous condition and in turn activate which light emitting diode 54 or 56 that would be representative of the less dangerous condition.

The structure of the microprocessor 50 is deemed to be conventional and it is readily available on the open market by numerous manufacturers. There are numerous types of microprocessors 50 that could be utilized. However, one type that is known to work satisfactorily is manufactured by Motorola, Inc., Part Number MC6804P2, entitles "8-Bit Microcomputer".

What is claimed is:

1. A radon gas detector comprising:
   a housing having an interior chamber, said interior chamber being completely closed to ambient light, said interior chamber being divided into an environment connecting chamber and a radiation ascertaining chamber;
   radiation sensitive means mounted between said environment connecting chamber and said radiation ascertaining chamber;
   air movement means mounted in connection with said environment connecting chamber, said air movement means for moving ambient air through said environment connecting chamber;
   electronic means for detecting radiation within the air which is passing through said environment connecting chamber, said electronic means also including radiation counting means, said electronic means producing an output based on the type and quantity of radiation in said environment connecting chamber; and
   display electronics for receiving said output and displaying accordingly a display representative of the amount and type of radiation located within said environment connecting chamber and hence within the ambient air.

2. The radon gas detector as defined in claim 1 wherein:
   said radiation sensitive means including a wall separating said environment connecting chamber and said radiation ascertaining chamber, said wall being transparent, a coating applied to said wall, said coating being sensitive to radiation.

3. The radon gas detector as defined in claim 2 wherein:
   said coating comprising a phosphorescent material.

4. The radon gas detector as defined in claim 3 including:
   a lens mounted in said radiation ascertaining chamber, said lens functioning to focus the light produced by the detected radiation onto said electronic means.

5. The radon gas detector as defined in claim 1 wherein:
   said display comprising a plurality of separate annunciators, said annunciators being progressively operated as the intensity of the radiation increases.

6. The radon gas detector as defined in claim 5 wherein:
   said annunciators including a plurality of lights.

7. The radon gas detector as defined in claim 6 wherein:
   said annunciators including an audible alarm.

8. The radon gas detector as defined in claim 1 including:
   switch means adapted to be connected to operate a ventilating fan which is to ventilate the ambient air upon the level of radiation within said environment connecting chamber reaching a predetermined level which is deemed to be hazardous to the health of human beings.

* * * * *